United States Patent Office 2,943,023
Patented June 28, 1960

2,943,023

PRODUCTION OF SPIRAMYCIN

Léon Ninet, Paris, and Jean Verrier, Boulogne, France, assignors to Societe des Usines Chimiques Rhone-Poulenc, Paris, France, a French body corporate No Drawing. Filed May 24, 1957, Ser. No. 661,292

Claims priority, application France May 30, 1956

18 Claims. (Cl. 195—80)

This invention is for improvements in or relating to the production of antibiotics and is more particularly concerned with improvements in the preparation of spiramycin by the culture of *Streptomyces ambofaciens* NRRL 2420 in a nutritive medium.

It is known that spiramycin, an antibiotic composed of three constituents of very similar properties, spiramycins I, II and III, is produced by the culture of a Streptomyces (*S. ambofaciens*) in appropriate culture media (see our British specification No. 758,726 and U.S. application Serial No. 441,634 and see also United States application Serial No. 558,753). In this specification the term "spiramycin," when not otherwise qualified, refers to the mixture of the three spiramycins I, II and III which is obtained by such culture process. When a micro-organism is cultivated with the aim of producing a predetermined substance, it is necessary to supply it with a group of organic and mineral substances which the micro-organism is capable of utilising not only for its growth but also for the production of the desired substance. It is well known that this growth and this production are both governed by the presence or absence in the culture medium of certain elements and by their relative proportions and that slight variations in the quality or quantity of these elements can increase considerably the yield of the desired substance.

Heretofore spiramycin could only be obtained by the culture of *S. ambofaciens* in media containing complex substances such as soya bean meal, corn-steep, malt extract, extracts or autolysates of yeast, or fish meals, in the presence of sources of assimilable carbon and certain mineral salts. The difficulties which these complex substances present arise principally from the variability of their composition according to their source and sometimes also during storage. As these substances act as the aggregate of their constituents on the production of spiramycin and without its being possible to determine in which way the constituents act, it is not surprising that the results obtained in the course of different fermentations can be rather variable when the quality of the starting material changes, and that it is necessary to alter the proportions for each batch to obtain the maximum yield of the antibiotic.

From this it is evident that it was desirable to find a medium prepared from well defined simple substances, capable of ensuring the growth of *S. ambofaciens* and the production of substantial quantities of spiramycin.

The object of the present invention is the use of a satisfactorily reproducible culture medium starting from pure, defined, substances, capable of producing consistently high yields of spiramycin. Another object of the present invention is the use of a culture medium containing only those elements indispensable to the growth of the Streptomyces, to the exclusion of all elements which are not indispensable and which might hinder the extraction of the spiramycin. A further object of this invention is to render it possible to influence considerably and in a reproducible manner, the proportions of the constituents I, II and III of spiramycin, by slight variations of the proportions of the constituents of the growth medium.

Although it has already been attempted to produce certain antibiotics, such as penicillin, streptomycin and chlortetracycline by culture in synthetic media of the micro-organisms which produce them, such media do not appear to have been employed for the industrial production of these antibiotics, either because the yields of antibiotic obtained by the use of these media are very inferior to those obtained with more complex natural media, or because the need to introduce into these media pure amino-acids or vitamins results in a cost much higher than that of material obtained using complex natural products.

It is surprising, therefore, that for the preparation of spiramycin it has been possible to find a culture medium for *S. ambofaciens* which contains only simple, defined constituents, which are cheap and readily available, capable of assuring on a commercial scale an excellent yield of this antibiotic, equal or superior to that obtained with the best media based on complex and poorly defined substances.

The medium used in the present invention contains a source of carbon such as glucide (a term which includes the simple nonhydrolysable sugars and compounds which hydrolyse to give one or more simple sugars with or without non-sugar components), polyhydric alcohol or oil, a single nitrogen source in the form of an ammonium salt and finally certain essential mineral constituents: chloride, phosphate and carbonate anions and sodium, magnesium, zinc and cobalt cations, capable of assuring high yield. As carbohydrates there can be used monosaccharides such as glucose, d-mannose, d-galactose, polysaccharides such as maltose, dextrin, glycogen and starch, and sugar alcohols such as glycerol or mannitol. Lipids can also be used, such as animal and vegetable oils. The concentration of saccharides can vary between 20 and 100 g./litre. Preferably starch is used at a concentration of 35 to 45 g./litre.

Ammonium salts are used as the source of nitrogen. The term "ammonium salt" includes any mineral or organic salt of which the cation does not hinder the development of the micro-organism and production of the antibiotic. As non-limitative examples can be cited chloride, sulphate, nitrate, phosphate, acetate, lactate, citrate and tartrate. For reasons of convenience the chloride and sulphate are used for preference in quantities corresponding to a total nitrogen content between 1 and 1.6 g./litre, the optimum being between 1.2 and 1.4 g./litre.

The chloride ion is equally indispensable for the growth and the production of spiramycin. Good results are obtained with a chloride ion concentration of 6 to 20 g./litre, the optimum being between 10 and 14 g./litre. The chloride ion is introduced in the form of sodium or potassium chloride.

In the case of the production of spiramycin, phosphate ions seem more important for their chemical role than for their buffering action. It seems, nevertheless, that the phosphate concentration is of great importance, for the growth of Streptomyces, production of spiramycin, and the distribution of the three constituents. A concentration of 1 to 8 g./litre of monopotassium phosphate is highly satisfactory, with an optimum of 2 to 4 g./litre. Other alkali or alkaline earth metal phosphates are also suitable. Phosphate can also be used in other forms, for example, pyrophosphates, metaphosphates, polyphosphates and glycerophosphates in the form of alkali or alkaline earth metal salts. Calcium glycerophosphate, for instance, may be employed in concentrations between 2 and 20 g./litre, the optimum being 10–15 g./litre.

Likewise, a magnesium salt is included in the medium in the form of the chloride or sulphate in a concentration varying between 0.2 and 4 g./litre, the optimum being in the region of 1 g./litre. Since cultures of *Streptomyces ambofaciens* tend to become acidic, it is necessary to add a potential neutralising agent, such as alkaline earth metal carbonates, preferably calcium carbonate. The concentration can vary between 2 and 20 g./litre, but the most favourable concentrations for a rapid, high production lie between 5 and 10 g./litre.

It has been found that minimal quantities of certain metals greatly assist the production of spiramycin by *Streptomyces ambofaciens* NRRL 2420 in the ammonium salt-based synthetic medium described above. It has likewise been found that other metals, without producing an overall increase in total yield, can modify the proportions of the three spiramycin constituents or simply improve the growth of the micro-organism.

It is, however, particularly surprising that the greatest increase in yield should be due to a very specific metal, zinc, other metals giving only comparatively insignificant increases. Among the latter, cobalt is the most interesting since it retains its effect when added with zinc and thus permits an additional increase in the yield.

Zinc and cobalt can be added to the medium in the form of salts such as the chloride, sulphate, nitrate, or any other salt which liberates these metals in the ionised state.

The most suitable quantities of zinc are between 0.5 and 50 mg./litre, the optimum being about 10 to 20 mg./litre. Those of cobalt are much smaller and are between 0.02 and 0.5 mg./litre, the optimum being 0.1 mg./litre. However, in the case where the medium contains citrate or tartrate ions, it could be beneficial to use increased quantities of zinc and cobalt. The most suitable amounts of zinc are then 50 to 500 mg./litre, with the optimum about 50–250 mg./litre. Those of cobalt are between 0.1 and 10 mg./litre, with the optimum 0.5 to 5 mg./litre.

The other metals capable of affecting primarily the proportions of the three spiramycin constituents are iron, nickel and manganese. They are active only if used alone and they are practically without effect when associated with zinc or cobalt. A suitable concentration for the use of iron is between 1 and 10 mg./litre and for nickel and manganese between 0.02 and 0.2 mg./litre.

Various other ions, such as copper, molybdenum and vanadium can be included in the medium with advantage to the degree or rapidity of development of the Streptomyces.

A synthetic medium, based on ammonium and metal salts, such as has been described, presents a considerable material advantage both in simplicity of supply and in the resulting cost.

Further, the use of simple chemical substances which can be rigorously controlled, assures a much greater constancy in the composition of the medium and, hence, a more certain reproducibility in the fermentations. This reproducibility facilitates the control of the fermentations, which, in the case of the production of spiramycin, may be of particular interest if it is desired to obtain preparations containing a variable proportion of the three constituents. Thus the content of spiramycin I in the final product can be increased or diminished at will by altering either separately or simultaneously the composition of the medium with respect to ammonium salts, alkali metal phosphate and calcium carbonate. For example, all concentrations of ammonium salts above or below the optimum range cause a reduction in the total yield with an increase in the proportion of spiramycin I. Similarly, all other things being equal, an increase in the calcium carbonate content of the medium produces an increase in the proportion of spiramycin I while an increase in monopotassium phosphate has the reverse effect. If analogous results are observed in certain cases with natural media, it is impossible to obtain them consistently because of the inevitable variations in the composition of the starting materials.

In carrying the present invention into effect the same operating conditions as those disclosed in our British specification No. 758,726 can be employed save insofar as the constitution of the culture medium is concerned. In this connection, inoculation of the producer culture, i.e. production of the culture inoculum, may, if desired and as will be illustrated in the examples which follow, be achieved by the method disclosed in our British specification 758,726 wherein a culture of *S. ambofaciens* is developed in a corn-steep liquor containing culture medium.

The following non-limitative examples show how the invention may be put into practice:

*Example I*

A 2 litre Erlenmeyer flask is charged with 250 cc. of the following medium:

| | |
|---|---|
| Corn-steep (50% dry extract) _____ g-- | 40 |
| Glucose _____ g-- | 20 |
| Sodium chloride _____ g-- | 5 |
| Magnesium sulphate _____ g-- | 1 |
| Tap water _____ cc-- | 1000 |

The pH is adjusted to 6.8 with sodium hydroxide and the charge is completed by:

| | |
|---|---|
| Calcium carbonate _____ g-- | 5 |
| Soya bean oil _____ cc-- | 4 |

The medium is sterilised for 45 minutes at 120° C. After cooling, it is inoculated with an agar culture of the strain of *Streptomyces ambofaciens* NRRL 2420. The culture is agitated for 48 hours on a shaking-table and constitutes the "culture inoculum."

The following medium is separately prepared:

| | |
|---|---|
| Starch _____ g-- | 40 |
| Ammonium chloride _____ g-- | 5 |
| Sodium chloride _____ g-- | 20 |
| Magnesium sulphate _____ g-- | 1 |
| Monopotassium phosphate _____ g-- | 2 |
| Water to make total volume, 1000 cc. | |

The pH is adjusted to 6.8 with sodium hydroxide and then

| | |
|---|---|
| Calcium carbonate _____ g-- | 5 |
| Soya bean oil _____ cc-- | 4 | are added.

300 cc. Erlenmeyer flasks are charged with 40 cc. of this medium.

Zinc sulphate and cobalt chloride are added according to the proportions shown in the following table, which summarizes the results obtained.

The Erlenmeyer flasks are sterilized for 30 minutes at 120° C., then, after cooling, are inoculated with 5 cc. of the "culture inoculum" in the 2 litre Erlenmeyer, and agitated at 25° C. on the shaking table. Assays of the antibiotic are made on the 6th, 7th and 8th days of culture in order to determine the maximum activity.

| Content of medium in mg./litre | | Maximum Activity, mcg./cc. | Proportion of Spiramycins (percent) | | |
|---|---|---|---|---|---|
| Zinc Sulphate | Cobalt Chloride | | I | II | III |
| 0 | 0 | 540 | 48 | 22 | 30 |
| 3 | 0 | 590 | 25 | 60 | 15 |
| 4 | 0 | 590 | 22 | 60 | 18 |
| 5 | 0 | 580 | 14 | 74 | 12 |
| 3 | 0.3 | 600 | 19 | 69 | 12 |
| 4 | 0.3 | 645 | 23 | 61 | 16 |
| 5 | 0.3 | 710 | 25 | 53 | 22 |
| 10 | 0.3 | 760 | 15 | 50 | 35 |
| 20 | 0.3 | 770 | 10 | 58 | 32 |
| 30 | 0.3 | 850 | 12 | 56 | 32 |
| 40 | 0.3 | 740 | 8 | 62 | 30 |
| 50 | 0.3 | 680 | 10 | 58 | 32 |

Example II 300 cc. Erlenmeyer flasks are charged with 40 cc. of the following medium:

| | | |
|---|---|---|
| Starch | g | 40 |
| Ammonium chloride | g | 5 |
| Sodium chloride | g | 20 |
| Magnesium sulphate | g | 1 |
| Zinc sulphate | mg | 5 |
| Cobalt chloride ($6H_2O$) | mg | 0.3 |
| Soya bean oil | cc | 4 |

Water to make total volume 1 litre.

Monopotassium phosphate and calcium carbonate are also added according to the proportions shown in the table below. The culture conditions are those of the preceding example.

The results are as follows:

| Content of medium, g./litre | | Maximum Activity, mcg./cc. | Proportion of Spiramycins (percent) | | |
|---|---|---|---|---|---|
| Mono-potassium phosphate | Calcium Carbonate | | I | II | III |
| 2 | 5 | 615 | 13 | 57 | 30 |
| 2 | 7 | 595 | 36 | 39 | 25 |
| 2 | 9 | 565 | 49 | 23 | 28 |
| 3 | 7 | 605 | 25 | 54 | 21 |
| 3 | 9 | 610 | 39 | 36 | 25 |
| 4 | 7 | 620 | 28 | 58 | 14 |
| 4 | 9 | 650 | 34 | 47 | 19 |
| 4 | 11 | 685 | 46 | 36 | 18 |

Example III

Into a 170 litre fermentation vessel there are placed:

| | | |
|---|---|---|
| Corn-steep (50% dry extract) | kg | 4.800 |
| Glucose | kg | 2.400 |
| Sodium chloride | kg | 0.600 |
| Magnesium sulphate | kg | 0.120 |
| Tap water | litres | 100 |

The pH is adjusted to 6.8 with sodium hydroxide and the charge is completed with:

| | | |
|---|---|---|
| Calcium carbonate | kg | 0.600 |
| Soya bean oil | litres | 0.480 |

The medium is sterilised at 120° C. for 45 minutes. After allowing the temperature to reach 26° C. the medium is inoculated with 250 cc. of a culture in a shaken Erlenmeyer flask of *Streptomyces ambofaciens* NRRL 2420.

The culture is aerated and agitated for 25 hours and constitutes the "culture inoculum."

The producer culture is carried out in a 800 litre fermentation vessel charged with the following medium:

| | | |
|---|---|---|
| Starch | kg | 16 |
| Ammonium chloride | kg | 2 |
| Sodium chloride | kg | 8 |
| Monopotassium phosphate | kg | 1.6 |
| Magnesium sulphate | kg | 0.4 |
| Zinc sulphate ($7H_2O$) | g | 2 |
| Cobalt chloride ($6H_2O$) | g | 0.12 |
| Tap water | litres | 370 |

The pH is adjusted to 6.7 by the addition of sodium hydroxide (850 cc., 36° Bé.). The charge is completed with:

| | | |
|---|---|---|
| Calcium carbonate (precipitated) | kg | 2 |
| Soya bean oil | cc | 1600 |

The medium is sterilised by the passage of steam for 40 minutes at 120° C. After cooling the volume is 400 litres and the pH is 7.

The medium is then inoculated with 40 litres of the "culture inoculum" then agitated with a mechanical stirrer turning at 205 r.p.m. aerated with 15 metres $^3$/hour of air and maintained at 25° C.

The development of the mycelium on this medium is excellent and rapid. From the beginning the pH falls regularly, reaching 5.4 after 48 hours. It then rises to 6 and then remains level between 6.0 and 6.2 until 115 hours. It then rises steadily and exceeds 7 after 150 hours.

The consumption of starch is very rapid during the first 40 hours and then becomes very slow. The final activity of the wort is 795 mcg./cc. The respective proportions of the three spiramycins, by weight, are as follows: I, 57%; II, 25%; III, 18%.

Example IV

Two 800 litre fermentation vessels are charged as in Example III, only the charges of monopotassium phosphate and calcium carbonate being altered.

The results obtained are shown in the following table:

| Fermentation vessel | A | B |
|---|---|---|
| Monopotassium phosphate kg | 0.800 | 0.800 |
| Calcium carbonate kg | 2.800 | 3.600 |
| Maximum activity in mcg./cc. | 1,015 | 880 |
| Proportion of Spiramycins: | | |
| I | 50 | 61 |
| II | 31 | 17 |
| III | 19 | 22 |

Example V

Three 800 litre fermentation vessels are charged as in Example III but the quantity of ammonium chloride is altered for each one, as shown in the table below, which summarises the results obtained:

| Fermentation vessel | A | B | C |
|---|---|---|---|
| Ammonium chloride kg | 1.800 | 2.000 | 2.200 |
| Maximum Activity in mcg./cc. | 680 | 850 | 625 |
| Proportion of Spiramycins: | | | |
| I | 28 | 22 | 37 |
| II | 50 | 52 | 33 |
| III | 22 | 26 | 30 |

Example VI

An 800 litre fermentation vessel is charged as in Example III but the ammonium chloride (2 kg.) is replaced by ammonium sulphate (2.400 kg.).

Under these conditions, the final activity is 940 mcg./cc. with the following proportion of the three spiramycins: I, 71%; II, 17%; III, 12%.

Example VII

An 800 litre fermentation vessel is charged with the following medium:

| | | |
|---|---|---|
| Starch | kg | 16 |
| Ammonium chloride | kg | 2 |
| Sodium chloride | kg | 6.8 |
| Potassium chloride | kg | 1.2 |
| Magnesium sulphate ($7H_2O$) | kg | 0.4 |
| Calcium glycerophosphate | kg | 4.8 |
| Zinc sulphate ($7H_2O$) | g | 12 |
| Cobalt chloride ($6H_2O$) | g | 0.12 |

Tap water to make total volume 370 litres.

The pH is adjusted to 6.7 by addition of sodium hydroxide (36° Bé.). The charge is completed with:

| | | |
|---|---|---|
| Calcium carbonate (precipitated) | kg | 2 |
| Soya bean oil | cc | 1600 |

The experiment is conducted as in Example III. After 6 days, the culture has attained its maximum activity of 735 mcg./cc. The respective proportions of the three spiramycins are as follows:

I, 46%; II, 16%; III, 38%.

Examples VIII

An 800 liter fermentation vessel is charged under the same conditions as previously described with the following medium:

| | | |
|---|---|---|
| Starch | kg | 16 |
| Ammonium chloride | kg | 2 |
| Sodium chloride | kg | 6.8 |
| Potassium chloride | kg | 1.2 |
| Magnesium sulphate (7H$_2$O) | kg | 0.4 |
| Monopotassium phosphate | kg | 1.6 |
| Citric acid | g | 100 |
| Zinc sulphate (7H$_2$O) | g | 20 |
| Cobalt chloride (6H$_2$O) | g | 0.12 |
| Calcium carbonate | kg | 2 |
| Soya bean oil | cc | 1600 |

Tap water to make total volume, 370 liters.

The fermentation is carried out under the same conditions as in Example III. Maximum activity of 900 mcg./cc. is attained in 7 days. The proportions of the three spiramycins in the final product is as follows: I, 43%; II, 42%; III, 15%.

Example IX

A medium is prepared as follows:

| | | |
|---|---|---|
| Starch | g | 40 |
| Ammonium tartrate | g | 8.5 |
| Sodium chloride | g | 17 |
| Potassium chloride | g | 3 |
| Monopotassium phosphate | g | 4 |
| Magnesium sulphate (7H$_2$O) | g | 1 |
| Zinc sulphate (7H$_2$O) | g | 1 |
| Cobalt chloride (6H$_2$O) | g | 0.03 |
| Water to make total volume | cc | 1000 |

The pH is adjusted to 6.8 with sodium hydroxide and then

| | | |
|---|---|---|
| Calcium carbonate | g | 10 |
| Soya bean oil | cc | 4 | are added.

50 cc. of this medium is distributed to each 300 cc. Erlenmeyer flask. The medium is inoculated and incubated under the same conditions as in Example I. The maximum activity obtained is 1200 mcg./cc., with the proportion of the three spiramycins as follows: I, 79%; II, 18%; III, 3%.

We claim.

1. In a process for the production of spiramycin wherein *Streptomyces ambofaciens* NRRL 2420 is subjected to aerobic cultivation in a nutrient medium until substantial antibiotic activity is produced by the organism in the culture medium and spiramycin is recovered from the culture medium, the improvement which consists in employing as the source of nitrogen in the nutrient medium an ammonium salt together with chloride, phosphate and carbonate anions and sodium, magnesium, zinc and cobalt cations.

2. In a process for the production of spiramycin wherein *Streptomyces ambofaciens* NRRL 2420 is subjected to aerobic cultivation in a nutrient medium until substantial antibiotic activity is produced by the organism in the culture medium and spiramycin is recovered from the culture medium, the improvement which consists in employing as the source of nitrogen in the nutrient medium an organic ammonium salt together with chloride, phosphate and carbonate anions and sodium, magnesium, zinc and cobalt cations.

3. In a process for the production of spiramycin wherein *Streptomyces ambofaciens* NRRL 2420 is subjected to aerobic cultivation in a nutrient medium until substantial antibiotic activity is produced by the organism in the culture medium and spiramycin is recovered from the culture medium, the improvement which consists in employing as the source of nitrogen in the nutrient medium a mineral ammonium salt together with chloride, phosphate and carbonate anions and sodium, magnesium, zinc and cobalt cations.

4. A process according to claim 1 wherein the culture medium contains an assimilable source of carbon selected from the group consisting of carbohydrates, sugar alcohols and lipids.

5. A process according to claim 1 wherein a saccharide is employed as the assimilable source of carbon in amount lying between 20 and 100 grammes per litre of culture medium.

6. A process according to claim 1 wherein starch is employed as the assimilable source of carbon in a concentration of 35 to 45 grammes per litre of culture medium.

7. A process according to claim 1 wherein the ammonium salt is employed in the form of chloride in amount corresponding to a total nitrogen content between 1 and 1.6 grammes per litre of culture medium.

8. A process according to claim 1 wherein the ammonium salt is employed in the form of sulphite in amount corresponding to a total nitrogen content between 1.2 and 1.4 grammes per litre of culture medium.

9. A process according to claim 1 wherein the content of chloride ion lies between 6 and 20 grammes per litre of culture medium.

10. A process according to claim 1 wherein the chloride ion is supplied as alkali metal chloride in amount between 10 and 14 grammes per litre of culture medium.

11. A process according to claim 1 wherein the phosphate ion is supplied in the form of monopotassium phosphate in amount lying between 1 and 8 grammes per litre of culture medium.

12. A process according to claim 1 wherein the culture medium contains calcium glycerophosphate employed in a concentration between 2 and 20 grammes per litre of culture medium.

13. A process according to claim 1 wherein the proportion of zinc ions in the culture medium lies between 0.5 and 50 milligrams per litre of culture medium.

14. A process according to claim 1 wherein the culture medium contains cobalt ions in concentration lying between 0.02 and 0.5 milligram per litre of culture medium.

15. A process according to claim 1 wherein the culture medium contains a member of the class consisting of magnesium chloride and sulphate in a concentration lying between 0.2 and 4 grammes per litre of culture medium.

16. A process according to claim 1 wherein the culture medium contains an alkaline earth metal carbonate in amount lying between 2 and 20 grammes per litre of culture medium.

17. A process according to claim 1 wherein the culture medium contains iron in amount lying between 1 and 10 milligrams per litre of culture medium.

18. A process according to claim 1 wherein the culture medium contains a member of the class consisting of nickel and manganese ions and mixtures thereof each in amount lying between 0.02 and 0.2 milligram per litre.

References Cited in the file of this patent

UNITED STATES PATENTS

| | | |
|---|---|---|
| 2,671,755 | Benedict et al. | Nov. 11, 1952 |
| 2,691,618 | Tanner et al. | Oct. 12, 1954 |

FOREIGN PATENTS

| | | |
|---|---|---|
| 785,726 | Great Britain | Oct. 10, 1956 |

OTHER REFERENCES

Waksman et al.: Actinomycetes and Their Antibiotics, The Williams and Wilkins Co., Baltimore, Md. (1953), pp. 54, 57, 59, 168–184.

Hesseltine et al.: "Ann. New York Acad. Sci." vol. 60, Art. 1 (1954), pp. 136–151.

Pinnert: Ann. Inst. Pasteur, vol. 87, 1954, page 702.

Stevenson: Nature, September 25, 1954, pp. 598–599.

Corbaz et al.: Staffwechelprodukte von Actinomyceten, *Helvetica Chimica Acta*, vol. 39, No. 32, February 1, 1956, pp. 304–317.